Patented May 28, 1935

2,003,233

UNITED STATES PATENT OFFICE 2,003,233

PROCESS OF MANUFACTURING HIGH VISCOSITY INDEX OILS

Harry T. Bennett, Tulsa, Okla., assignor to Mid-Continent Petroleum Corporation, Tulsa, Okla., a corporation of Delaware No Drawing. Application March 2, 1931, Serial No. 519,698

25 Claims. (Cl. 196—13)

This invention relates to processes of manufacturing oils having high viscosity indices, the object being to provide a practicable method of obtaining oils having high viscosity indices from oils having lower viscosity indices.

The viscosity of an oil having a low viscosity index will change very greatly in response to changes in temperature, while an oil having a high viscosity index will withstand such variations in temperature without undergoing the same degree of change in its viscosity.

For example, lubricating oils made from Pennsylvania crude oils are superior to ordinary lubricating oils because there is a natural property in Pennsylvania oil which enables it to withstand great variations in temperature without undergoing the very high degree of change in viscosity that occurs when ordinary oils are subjected to such changes in temperature. The other extreme may be found in Gulf Coast oils wherein the same temperature changes will result in a far greater change in viscosity.

The viscosity index of an oil is a number indicating the extent to which its viscosity will change when the temperature is increased from 100° F. to 210° F. For example, a Pennsylvania lubricating oil is given a viscosity index of 100, while a Gulf Coast lubricating oil is given a viscosity index of zero. Oils from the Mid-Continent field may be given intermediate viscosity index ratings varying from about 50 to about 75.

More specific examples are given as follows, referring to A. P. I. gravities and Saybolt universal viscosities at 100° F. and 210° F.

| Kind of oil | Gravity | Viscosity 100° F. | Viscosity 210° F. | Viscosity Index |
|---|---|---|---|---|
| Pennsylvania | 28.0 | 604 | 70 | 100 |
| Gulf Coast | 21.0 | 596 | .55 | 0 |
| Mid-Continent | 25.05 | 584 | 60 | 55.4 |

The viscosity indices of different lubricating oils derived from any one of these fields will vary considerably from the specific examples given in the foregoing tables. However, they show the desirable property occurring naturally in the Pennsylvania oil, and producing a lubricant which, under varying temperatures, is superior to oils that lack this property.

Prior to this invention, attempts have been made to increase the viscosity index of lubricating oils intended for use in internal combustion engines, and other machines, wherein the lubricant is subjected to varying temperatures, but so far as I am aware these attempts have not resulted in an economical solution of the problem.

The difference in viscosity index is due to difference in the chemical composition of the respective oils, and the problem lies in producing a substantial increase in this index, without resorting to undue expense in carrying out the process.

I will now describe a simple and inexpensive process whereby all of the desired results have been accomplished, without resorting to the use of complex special equipment, and without excessive operating costs.

The low viscosity index of the oil to be treated is due to certain low index constituents which I withdraw from the oil, and in actual practice I have found that these withdrawn constituents have a viscosity index much lower than that of the original oil. However, the treated oil from which these constituents are withdrawn has a viscosity index considerably higher than that of the original oil.

In the preferred form of the invention, I mix the oil having a low viscosity index with halogenated ether which has a selective solvent action for the constituents of low viscosity index. The resultant solution is permitted to settle, and the halogenated ether containing the dissolved low viscosity constituents settles to the bottom where it can be readily discharged from the container and thus separated from the constituents having a high viscosity index. The objectionable constituents are thus withdrawn from the original oil to produce an oil with a much higher viscosity index.

An important factor in this result lies in the use of an ether capable of selecting and dissolving the undesirable constituents, and I prefer to use a halogenated ether. More specifically stated, the desired results can be accomplished by using a chlorinated ether, and as an illustration of one form of the invention, I will refer to the use of dichlorethyl ether, as follows:

A mixture comprising six parts beta beta' dichlorethyl and one part lubricating oil stock having a viscosity index of 55.4 is agitated at a temperature of about 175° F. to dissolve the oil in the chlorinated ether. The solution is then allowed to cool and settle. In carrying out this specific operation, the separation began at about 120° F., and after allowing the materials to cool to 70° F., the upper layer of treated oil was removed and reduced by distillation with fire and steam at 400° F. to remove any ether dissolved in the treated oil. The original oil and the treated oil had the following properties:

| | Gravity A.P.I. | Flash | Viscosity | | Viscosity index |
|---|---|---|---|---|---|
| | | | 100° F. | 210° F. | |
| Original oil | 25.0 | 460° F. | 584 | 60 | 55.4 |
| Treated oil | 29.6 | 445° F. | 380 | 56 | 91.4 |

It thus appears the treated oil had a much higher viscosity index than the original oil, and that the treatment also improved the gravity.

The residual solution separated from the treated oil was distilled to remove the chlorinated ether, which is thus recovered and may be used indefinitely in subsequent treatments. The residue of this distillation is a lubricating oil stock having a viscosity index lower than the orginal oil, but this residual oil is a valuable lubricant for use under conditions where it is not subjected to very great changes in temperature.

Even better results are obtained from other oils, as shown by the following example:

A treated and dewaxed long residuum Mid-Continent lubricating oil had the following properties:

Saybolt universal viscosity at 100° F_____ 1564.
Saybolt universal viscosity at 210° F_____ 102.
Viscosity index_____ 78.2

This petroleum oil was subjected to the treatment herein described, using 1 part of the oil to 5 parts chlorinated ether, and the treated oil had the following properties:

Saybolt universal viscosity at 100° F_____ 1349.
Saybolt universal viscosity at 210° F_____ 109.
Viscosity index_____ 101.7

A lubricating oil having the very high viscosity index of 101.7 was thus obtained from an oil having a low viscosity index of 78.2.

The chlorinated ether, or other halogenated ether, can be conveniently separated from the oil products by distillation, as herein described, or by other suitable methods.

The high temperatures have been found advantageous to quickly form the solution in carrying out batch operations, but other temperatures may be employed, and different percentages of the halogenated ether may be used with different oils and in accordance with the time in which it is desired to complete the separating operation. Furthermore, instead of adding all of the chlorinated ether to the oil at one time, it may be added by degrees with an interval of agitation after each portion is added. A continuous method of mixing and settling successive portions of the oil and solvent is more specifically set forth and claimed in an application for patent on "Processes of manufacturing high viscosity index oils", filed by me on May 2, 1932, Serial No. 608,590. In carrying out the invention, I have advantageously used acid and clay to treat the original oil and its separated constituents as specifically described and claimed in another application filed by me on October 22, 1932, Serial No. 639,046, each of said applications, 608,590 and 639,046, being a continuation in part of the present application. Details of operations I have employed in recovering the solvent are specifically set forth and claimed in an application Serial No. 606,764, filed by me on April 21, 1932 as a continuation in part of the present application.

In many selective solvent separations it is necessary to conduct the process at very low temperatures, such as zero to —30° F., but with the chlorinated ethers, such as dichlorethyl ether, the separation may be made at temperatures above freezing. The chlorinated ethers, such as dichlorethyl ether, have comparatively high boiling points and consequently the loss of solvent by evaporation and in distilling is small.

The separation of the oil into two fractions of high and low viscosity indices may be accomplished either before or after refining the oil, i. e., the oil may be first dewaxed and decolorized and then separated into the two fractions or, it may be first treated with the solvent and the separate portions treated by the usual refining methods.

An important feature of the invention lies in the fact that actual operations have shown that the process is entirely feasible and commercially practicable; that it can be readily carried out in ordinary refining equipment to obtain a very high grade paraffin lubricating oil from an inferior petroleum oil. Furthermore, the residual asphaltic oil, instead of being a low grade fuel oil, is valuable lubricant.

The dichlorethyl ether herein mentioned is also known as dichlor-diethyl ether.

I claim:

1. In the art of making lubricating oils, the process of producing oils having high viscosity indices which comprises commingling halogenated ether with an oil having a low viscosity index, agitating the mixture to form a solution wherein the oil constituents having a relatively low viscosity index unite with the halogenated ether, then separating said solution from the constituents having a higher viscosity index, and separately distilling the halogenated ether from the resultant products.

2. In the art of making lubricating oils, the process of producing oils having high viscosity indices which comprises commingling chlorinated ether with an oil having a low viscosity index, agitating the mixture to form a solution wherein the oil constituents having a relatively low viscosity index unite with the chlorinated ether, then separating said solution from the constituents having a higher viscosity index, and separately distilling the chlorinated ether from the resultant products.

3. In the art of making lubricating oils, the process of producing oils having high viscosity indices which comprises commingling dichlorethyl ether with an oil having a low viscosity index, agitating the mixture to form a solution wherein the oil constituents having a relatively low viscosity index are dissolved in the dichlorethyl ether, then separating said solution from the constituents having a higher viscosity index, and separately distilling the dichlorethyl ether from the resultant products.

4. In the art of making lubricating oils, the process of producing oils having high viscosity indices which comprises commingling beta beta' dichlorethyl ether with an oil having a low viscosity index, agitating the mixture at a temperature above 125° F. to form a solution wherein the oil constituents having a relatively low viscosity are dissolved in the dichlorethyl ether, then cooling the mixture and precipitating said solution to separate said constituents of relatively low viscosity index from the constituents having a higher viscosity index, and thereafter removing the dichlorethyl ether from the resultant products.

5. The method of removing naphthenic compounds and other undesirable components from mixed base lubricating oils which comprises heating and agitating the oil with dichlor-diethyl ether, cooling the oil and solvent until separation of paraffinic compounds from the solvent occurs, and separating the solvent together with its extract from the treated oil.

6. The method of improving the viscosity index of lubricating oil which comprises mixing said oil with a chlorinated ether, separating the mixture into an oil phase and a chlorinated ether phase, removing one phase from the other, and separating the chlorinated ether from the oil phase, thereby producing a lubricating oil having a higher viscosity index than the original oil.

7. The method of splitting mineral oils into components of higher and lower viscosity index which comprises contacting said oils with dichlor-diethyl ether at a temperature high enough substantially to obtain miscibility, cooling the mixture to separate the high viscosity index component containing dissolved ether from the low viscosity index component in the dichlor-diethyl ether solution, separating said solution from said high viscosity index component, and removing the dissolved ether from both components.

8. The method of treating oils containing paraffinic and naphthenic hydrocarbons which comprises mixing said oils with dichlor-diethyl ether, regulating the temperature of the mixture whereby the mixture separates into a paraffinic oil phase containing dissolved dichlor-diethyl ether and a dichlor-diethyl ether phase containing naphthenic oil, removing one phase from the other, and removing the ether from the oil in each phase.

9. The method of claim 6 wherein the ether is a chlor-ethyl ether.

10. The method of claim 6 wherein the ether is a dichlorinated ether.

11. The method of claim 6 wherein the ether is a beta chlorinated ether.

12. The method of claim 6 wherein the ether is a beta beta' halogenated ether.

13. The method of claim 6 wherein the ether is beta beta' dichlorethyl ether.

14. The method of claim 6 wherein the ether is beta beta' dichlorethyl ether and wherein the lubricating oil has received a preliminary refining treatment.

15. The method of claim 6 wherein the ether is beta beta' dichlorethyl ether and the lubricating oil is given a subsequent refining treatment.

16. The method of preparing high viscosity index lubricating oils which comprises treating a lubricating oil stock containing both paraffinic and naphthenic hydrocarbons, intimately mixing the treated oil stock with beta beta' dichlorethyl ether, effecting phase separation between the dichlorethyl ether containing dissolved naphthenic hydrocarbons and paraffinic oil containing dissolved dichlorethyl ether, removing said dichlorethyl ether phase from said paraffinic oil phase, and separately recovering dichlorethyl ether from both phases whereby a paraffinic oil having a higher viscosity index than the original oil is produced and a naphthenic oil having a lower viscosity index than the original oil is likewise produced.

17. The method of claim 16 wherein the paraffinic oil is subsequently refined.

18. The method of claim 16 wherein the oil is dewaxed before it is extracted with dichlorethyl ether.

19. The method of claim 16 wherein the separation of the dichlorethyl ether phase from the paraffinic oil phase is effected at about 70° F.

20. The method of claim 16 wherein dichlorethyl ether is removed from both phases by distillation with steam.

21. The method of claim 6 wherein the ether is beta beta' dichlorethyl ether and wherein the separation of paraffinic compounds from the ether phase is effected at a temperature of about 70° F.

22. The method of claim 6 wherein the ether is beta beta' dichlorethyl ether and wherein the ether is separated from the oil phase by distillation with steam.

23. The method of claim 1 wherein said relatively low viscosity index constituents are subsequently refined to produce a lubricating oil.

24. The method of claim 16 wherein the naphthenic oil is refined to produce a lubricating oil.

25. In the art of making high viscosity index oils from low viscosity index oils containing asphaltic materials, the process which comprises treating an oil containing asphaltic materials with a chlorinated ether to effect a separation of the oil into high and low viscosity index fractions, and removing the chlorinated ether from said fractions.

HARRY T. BENNETT.